United States Patent [19]
Wadzinski et al.

[11] Patent Number: 5,784,868
[45] Date of Patent: Jul. 28, 1998

[54] CONTROL SYSTEM FOR OUTDOOR POWER EQUIPMENT

[75] Inventors: Chris A. Wadzinski, Inver Grove Heights; Bart T. Ellson, Chanhassen; Anthony N. Pink, Shorewood; Jay J. Kakuk, Plymouth, all of Minn.

[73] Assignee: The Toro Company, Minneapolis, Minn.

[21] Appl. No.: 662,614

[22] Filed: Jun. 13, 1996

[51] Int. Cl.⁶ .............................. A01D 69/08; A01D 75/20
[52] U.S. Cl. ..................... 56/10.8; 56/11.3; 56/11.8
[58] Field of Search .................... 56/10.5, 10.8, 56/11.2, 11.3, 11.4, 11.6, 11.7, 11.8, DIG. 18; 74/501 R, 491; 180/19.2, 19.3

[56] References Cited

U.S. PATENT DOCUMENTS

| | | |
|---|---|---|
| 4,327,539 | 5/1982 | Bricko et al. |
| 4,335,566 | 6/1982 | Hurd |
| 4,413,466 | 11/1983 | Beugelsdyk et al. .............. 56/11.8 X |
| 4,538,401 | 9/1985 | Takamizawa et al. |
| 4,573,307 | 3/1986 | Wick ......................... 56/11.8 |
| 4,614,130 | 9/1986 | Heismann et al. .............. 56/10.8 X |
| 4,932,192 | 6/1990 | Ishimaru ..................... 56/11.8 |
| 5,195,307 | 3/1993 | Thorud et al. |
| 5,203,147 | 4/1993 | Long |
| 5,261,214 | 11/1993 | Wollersheim |
| 5,279,101 | 1/1994 | Sueshige ..................... 56/11.8 X |
| 5,355,662 | 10/1994 | Schmidt |

Primary Examiner—Michael J. Carone
Assistant Examiner—Robert Pezzuto
Attorney, Agent, or Firm—James W. Miller

[57] ABSTRACT

A control system for selectively actuating a component on an outdoor power equipment unit, such as a blade on a lawn mower, uses two separate and distinct operator actions to prevent inadvertent actuation. The control system includes a pivotal bail that must be pivoted from a first component disengaged position to a second component engaged position in which the bail lies flat against the handle assembly of the outdoor power equipment unit. A slide is slidably mounted on a housing, carried on one of the legs of the bail, for movement towards and away from the pivot axis of the bail. The slide must be pushed down to engage the lower end of the slide with a notch in a pivotal cam to temporarily link the cam to the bail in order to actuate the component. When the bail is released to return to its initial position, camming surfaces on the lower end of the slide and the notch are effective to mechanically cam the slide back up to its disengaged position where the lower end of the slide has disengaged the notch.

21 Claims, 5 Drawing Sheets

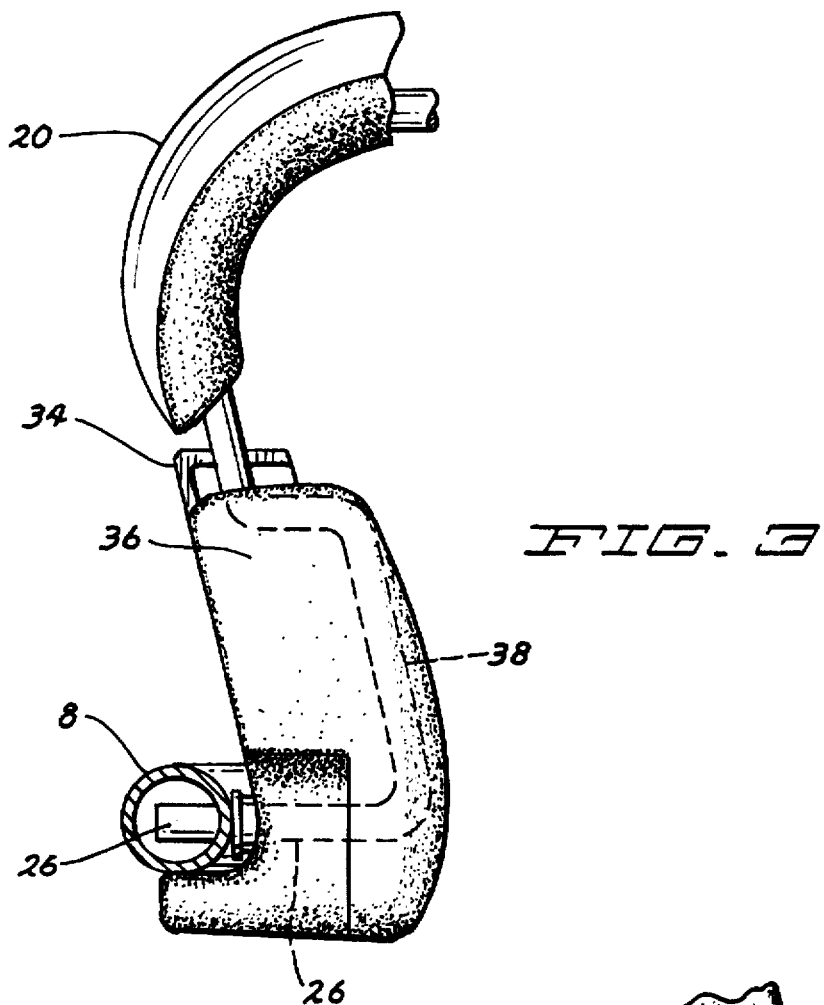
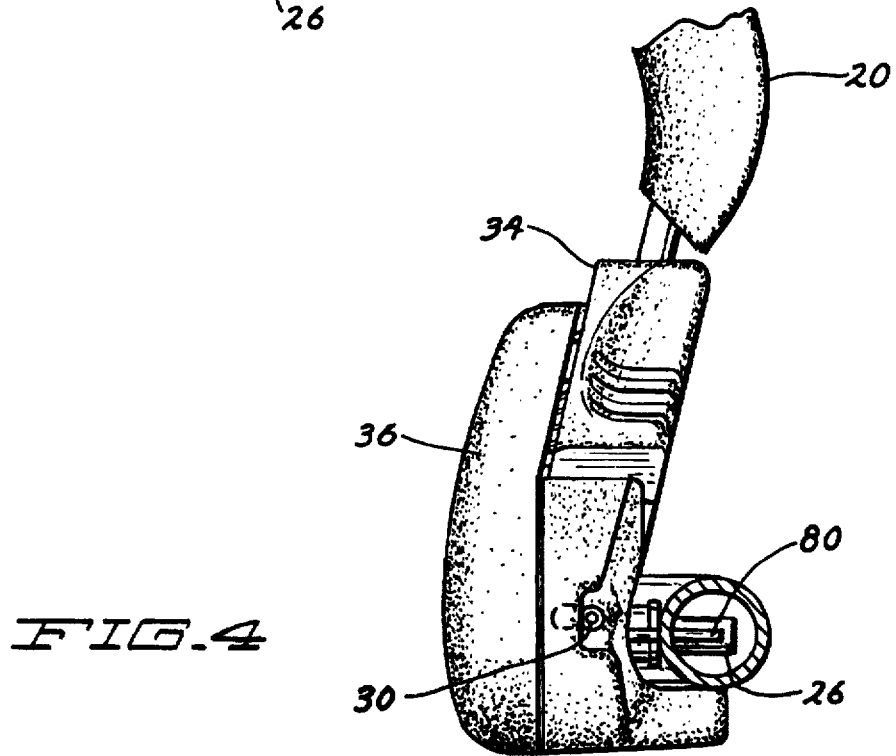

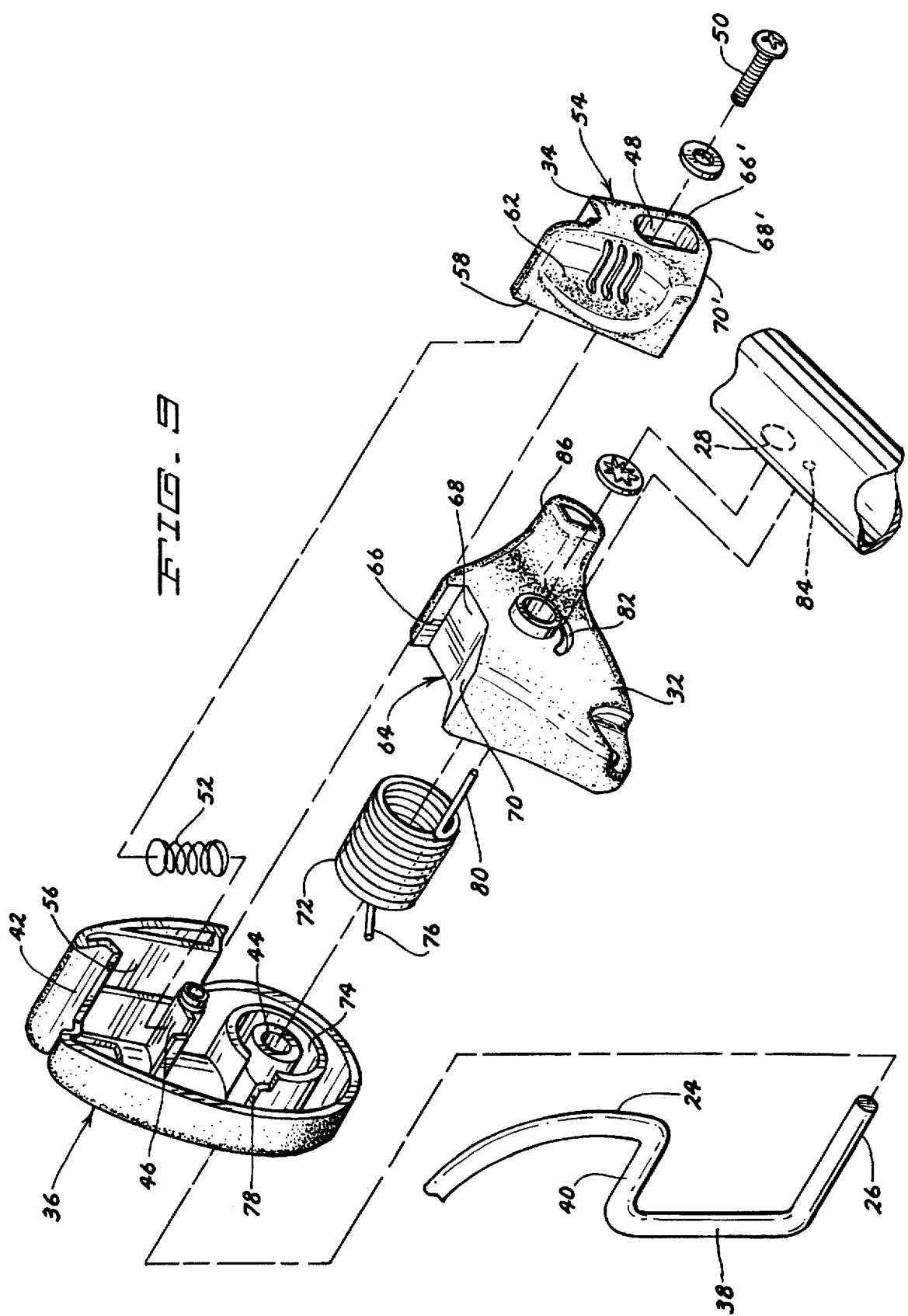

CONTROL SYSTEM FOR OUTDOOR POWER EQUIPMENT

TECHNICAL FIELD

This invention comprises a control system that uses two separate and distinct operator actions to selectively actuate at least one component of an outdoor power equipment unit.

BACKGROUND OF THE INVENTION

Control systems are known on rotary lawn mowers for allowing the operator to selectively start and stop rotation of the blade. Many of these control systems comprise a deadman's control carried on the handle assembly of the mower. Whenever the operator releases the deadman's control, the control moves to a blade disengaged position in which the rotation of the blade stops. Thus, if the operator slips and lets go of the deadman's control, the blade will automatically be stopped, thus preventing injury to the operator or to others.

To further enhance safety, many deadman's controls require that the operator use two separate and distinct actions to start the rotation of the blade. Thus, merely squeezing the deadman's control to its blade engaged position using a first action or motion is insufficient to start blade rotation. Some other separate and distinct action must also be done by the operator either before or in concert with the first action. Requiring two separate and distinct actions of the operator to obtain blade rotation prevents the operator from inadvertently starting the blade rotation.

U.S. Pat. No. 4,327,539 shows a lawn mower control system comprising a cockable deadman's control. In order to obtain blade rotation, the operator must first cock the deadman's control in a direction opposite to the direction in which the deadman's control is moved to its blade engaged position. Thus, the cocking action of the deadman's control comprises the first operator action with the subsequent movement of the deadman's control back in the reverse direction into the blade engaged position comprising the second operator action. Merely moving the deadman's control into its blade engaged position without first cocking it does not actuate the blade.

U.S. Pat. No. 4,538,401 discloses a pivotal deadman's control for obtaining blade rotation. Simply pivoting the deadman's control into its blade engaged position does not, in and of itself, start the rotation of the blade. Instead, the operator first has to push down on a knob and to then pivot the deadman's control to obtain blade rotation. However, there is no automatic reset of the knob once the deadman's control is released from its blade disengaged position, such that subsequent blade starts could be obtained without having to push down on the knob again. Thus, this system does not meet modern safety standards which require the use of two separate and distinct actions before each blade start.

Many of the control systems that are known do have system resets such that two actions are required after each release of the deadman's control to get subsequent blade starts. However, many of these systems are quite complex having many parts. In addition, these systems often use various springs and latches that must be aligned, and which must stay aligned, in order for the reset of the system to be properly accomplished.

SUMMARY OF THE INVENTION

It is one aspect of this invention to provide a two action control system for an outdoor power equipment unit in which the reset of the system after release of the deadman's control functions automatically in a foolproof manner.

These and other aspects of this invention are provided by a control system for an outdoor power equipment unit of the type having a selectively actuable component. The control system comprises a first movable control member mounted on the unit for movement between a component disengaged position and a component engaged position using a first operator action. A second movable control member is mounted on the unit for movement between a component disengaged position and a component engaged position using a second operator action that is separate and distinct from the first operator action, wherein both the first and second control members must be moved, respectively, into their component engaged positions using the first and second operator actions to obtain actuation of the component. A means is included for mechanically camming the second movable control member back into its component disengaged position during movement of the first movable control member from its component engaged position to its component disengaged position.

BRIEF DESCRIPTION OF THE DRAWINGS

This invention will be described hereafter in the Detailed Description, taken in conjunction with the following drawings, in which like reference numerals refer to like elements or parts throughout.

FIG. 3 is a cross-sectional view taken along lines 3—3 of FIG. 2, more particularly illustrating a portion of the control system of this invention from the rear;

FIG. 4 is a cross-sectional view taken along lines 4—4 of FIG. 2, more particularly illustrating a portion of the control system of this invention from the front;

FIG. 9 is a perspective view of the major components of the control system of this invention, shown in an exploded form for the sake of clarity.

DETAILED DESCRIPTION

Figure 1:
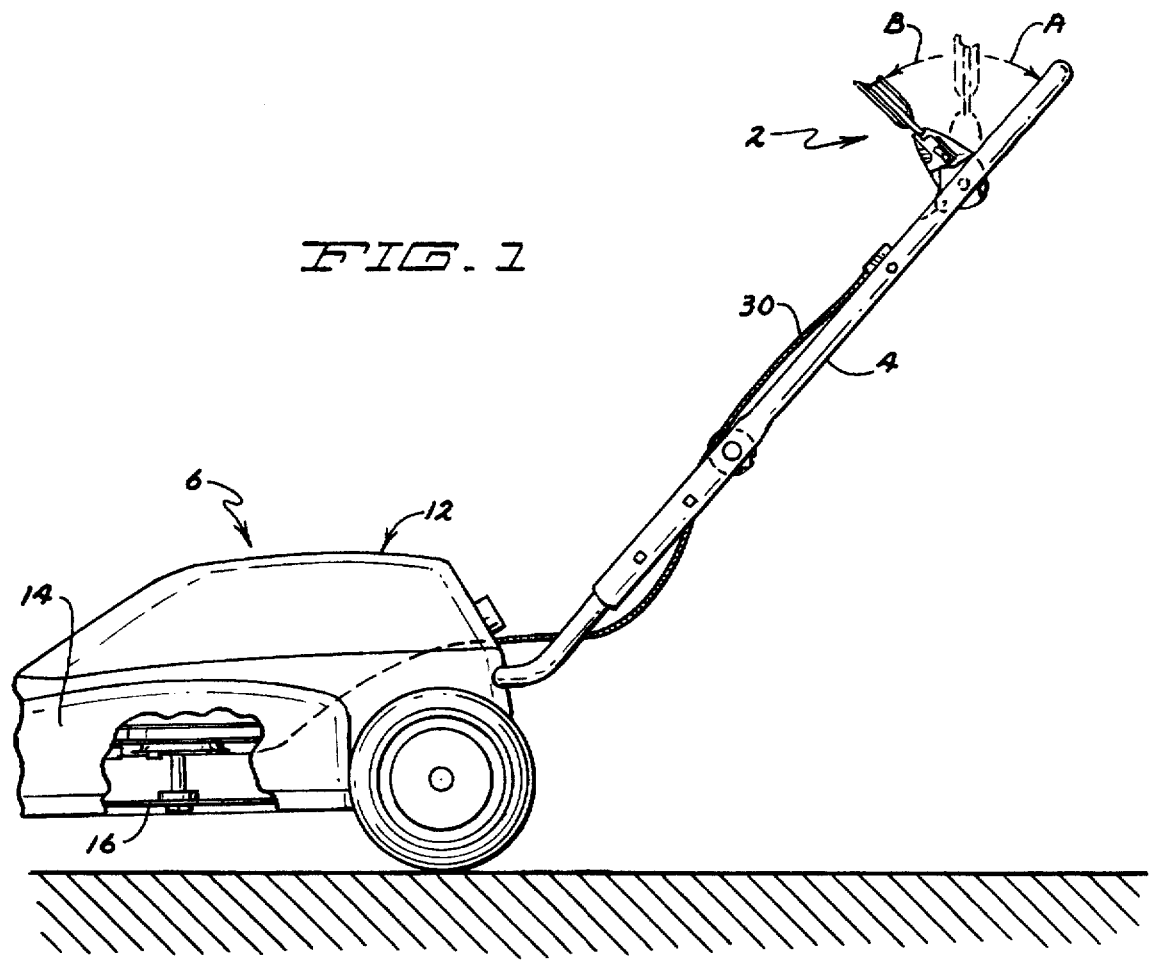
FIG. 1 is a side elevational view partly shown in cross-section of one kind of outdoor power equipment unit, namely a lawn mower, having a handle assembly on which the control system of this invention is installed.
Figure 2:
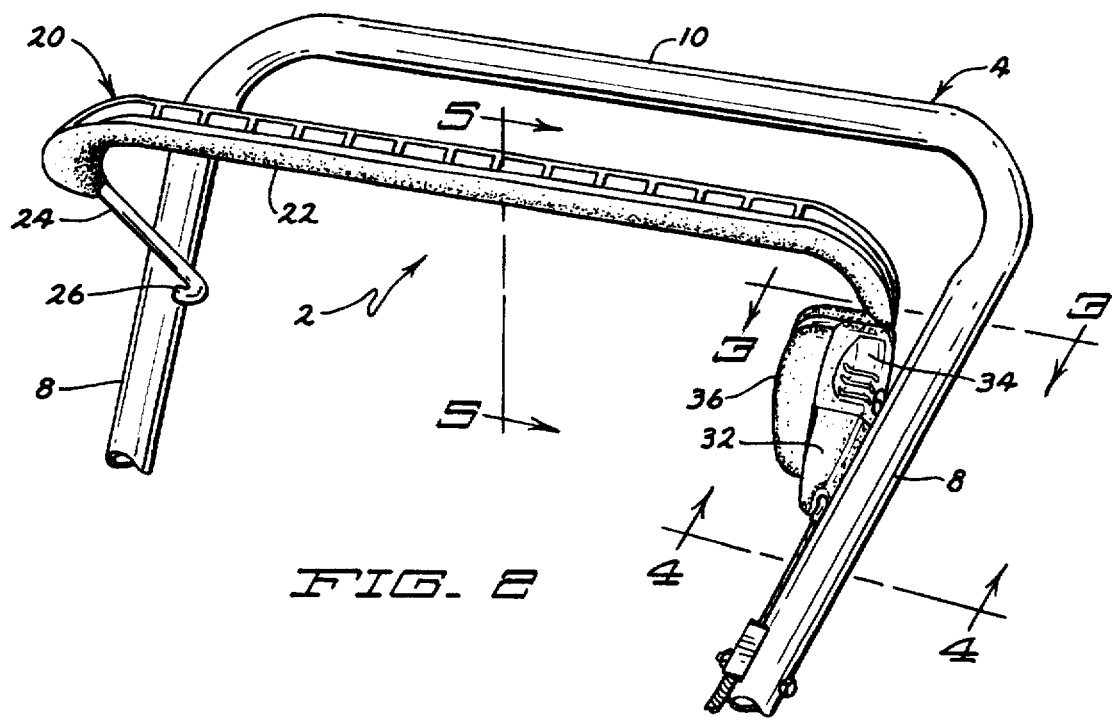
FIG. 2 is an enlarged perspective view of the upper portion of the handle assembly of the outdoor power equipment unit shown in FIG. 1, more particularly illustrating the control system of this invention.
Figure 5:
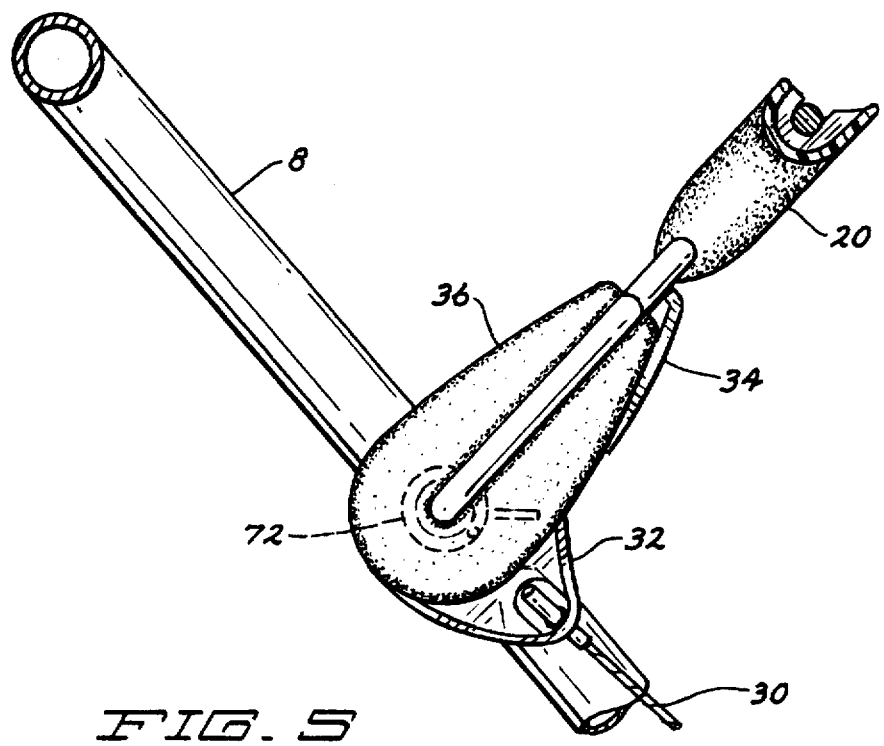
FIG. 5 is a side elevational view illustrating one side of the control system of this invention.

Referring to FIG. 1, an improved control system according to this invention is generally illustrated as 2. Control system 2 is mounted on a handle assembly 4 of an outdoor power equipment unit 6. As shown in FIG. 2, handle assembly 4 is U-shaped having two upwardly extending handle tubes 8 joined together at their upper ends by a cross tube 10. The operator grips and holds onto cross tube 10 to guide outdoor power equipment unit 6 during operation thereof. Control system 2 is located on the upper end of handle assembly 4 near cross tube 10 to be easily accessible to the operator.

The outdoor power equipment unit 6 shown in FIG. 1 is a lawn mower 12. More specifically, lawn mower 12 comprises a wheeled housing 14 suited for movement over the ground. A rotatable cutting element comprising a blade 16 is carried in a cutting chamber in housing 14 for severing grass or other vegetation at a pre-determined height above the ground.

Control system 2 selectively actuates at least one component of lawn mower 12, namely it selectively starts or stops rotation of blade 16. How this is done is unimportant to this invention and can vary depending upon the type of lawn mower 12 on which control system 2 is mounted. In an electrically powered mower, an electrical switch might be turned on and off by operation of control system 2 to start and stop rotation of blade 16. In a mower 12 powered by an internal combustion engine, a clutch might be interposed between the drive shaft of the engine and blade 16 with the clutch being operated by control system 2. In any event, the nature of the controlled component and how that controlled component is placed into and out of operation is not part of this invention. Control system 2 can be used with any component on outdoor power equipment unit 6 which is desirably placed into operation using two separate and distinct actions of the operator.

Moreover, it should be apparent that control system 2 is not limited for use with a lawn mower. There are many outdoor power equipment units having active components the operation of which is desirably controlled in a safe manner. For example, snowthrowers have rotatable snowthrowing augers and impellers which the operator must selectively start and stop. Control system 2 as disclosed herein would be as useful in controlling the operation of such snowthrowing augers and impellers in a snowthrower as it is blade 16 in lawn mower 12. Accordingly, the precise nature of outdoor power equipment unit 6 also forms no part of this invention.

Control system 2 includes a pivotal deadman's control in the form of a U-shaped bail 20 that is pivotally carried on the upper end of handle assembly 4. Bail 20 includes a transversely extending cross member 22 and spaced downwardly extending legs 24. Each bail leg 24 has an outwardly turned lower end 26 that serves as a pivot shaft for bail 20. Each lower end 26 of each leg 24 of bail 20 is pivotally received in a hole 28 on the adjacent handle tube 8. See FIG. 9.

Overall, bail 20 has a shape that is very similar to the shape of the upper portion of handle assembly 4. For example, when bail 20 is pivoted flat to lie against handle assembly 4, the transverse cross member 22 of bail 20 will lie adjacent the cross tube 10 of handle assembly 4 so that the operator's hands can grip both bail 20 and handle assembly 4 at the same time.

Bail 20 is normally maintained in a blade disengaged position as shown in solid lines in FIGS. 1 and 2 in which the transverse cross member 22 of bail 20 is spaced forwardly in front of cross tube 10 of handle assembly 4. When it is desired to obtain blade rotation, bail 20 has to be pivoted out of this blade disengaged position and into a blade engaged position in which bail 20 has been pivoted flat against handle assembly 4 and cross member 22 of bail 20 lies adjacent cross tube 10 of handle assembly 4. Thus, referring to FIG. 1, to obtain blade rotation, the operator has to pivot bail 20 in a clockwise direction from the solid line position in the direction of the arrow A. This pivoting motion of bail 20 out of its blade disengaged position and towards its blade engaged position is the first action of the operator that is needed to obtain blade rotation.

However, pivoting bail 20 as just described is itself insufficient to obtain blade rotation. Control system 2 includes a control cable 30 that must be pulled by bail 20 in order to obtain blade rotation with the lower end of control cable 30 being attached to the electric switch or clutch that begins blade rotation. But, control cable 30 is not itself directly attached to or operatively connected to bail 20. Instead, the upper end of control cable 30 is connected to a second pivotal member comprising a pivotal cam 32 that is independent of and which is rotatably journalled on the outturned lower end 26 of one of the legs 24 of bail 20. For control cable 30 to be pulled, pivotal cam 32 must be somehow linked to bail 20 such that rotation of bail 20 is also effective to rotate pivotal cam 32. That linking function is performed by a slide 34 that can be selectively pushed inwardly to temporarily link pivotal cam 32 to bail 20. This inward push on slide 34 is the second operator action which must occur in order to obtain blade rotation.

Bail 20 includes a housing 36 which captures and holds slide 34 when control system 2 is fully assembled. Housing 36 is shaped to be non-rotatably carried on a U-shaped bend 38 on one leg 24 of bail 20 such that housing 36 is carried with bail 20 during its pivoting movement. For example, the upper portion 40 of U-shaped bend 38 in bail leg 24 rests in an upwardly facing, concave trough 42 in housing 36 when housing 36 is installed on bail leg 24 with the outturned lower end 26 of bail leg 24 passing through a central hub 44 of housing 36. Thus, housing 36 is effectively captured on bail 20 for joint movement therewith.

Slide 34 is mounted for a vertical up and down motion on housing 36, i.e. a motion towards and away from the pivot axis of bail 20. Referring to FIG. 9, housing 36 includes a horizontally extending pin 46 that is received in a vertical slot 48 in slide 34 with a bolt 50 being threaded into a bore in pin 46 to hold slide 34 in place on housing 36. However, bolt 50 does not firmly clamp slide 34 on housing 36, but instead only loosely secures slide 34 to housing 36. Slide 34 must be free to move up and down on housing 36 over the range of motion provided by slot 48. A biasing spring 52 extends between the top of pin 46 and the underside of an upper internal surface on slide 34. Thus, biasing spring 52 normally exerts an upward force on slide 34, tending to bias slide 34 to its upper, blade disengaged position on housing 36 where the lower end of slot 48 engages pin 46. See FIG. 6.

In addition to being captured on pin 46, slide 34 has various surfaces that engage with portions of housing 36 to facilitate smooth up and down motion of slide 34. For example, referring to FIG. 7, the back 54 of slide 34 is a planar surface that abuts against a planar internal guide surface 56 on housing 36. The front of slide 34 extends up above back 54 to form an extended lip 58. This lip 58 abuts against and slides on the upper portion 40 of U-shaped bend 38 in bail leg 24. In addition, lip 58 includes a rear shoulder 60 that abuts against the bottom of the upper portion 40 of U-shaped bend 38 in bail leg 24 when slide 34 is in its upper position.

The front of slide 34 includes a recess 62 that is shaped to receive an operator's thumb therein. This helps the operator to engage and push down on slide 34 when desired to selectively engage or couple slide 34 to pivotal cam 32. As noted earlier, this pushing or sliding action of slide 34 is the second operator action that is required to obtain blade rotation, which action is separate and distinct from the pivoting action needed to rotate bail 20.

The manner in which slide 34 engages or is coupled to pivotal cam 32 is noteworthy. Pivotal cam 32 includes a notch 64 in the upper edge thereof which includes a rear, generally vertical surface 66 that is generally perpendicular to the direction of rotation of bail 20, a bottom base surface 68, and a forward, inclined camming surface 70. The bottom of slide 34 is formed with a complementary set of surfaces. In other words, the bottom of slide 34 also includes a forward, inclined camming surface 70', a flat bottom base surface 68', and an upwardly extending rear surface 66' that is simply the lower end of the back 54 of slide 34. When slide 34 is pushed down, the complementary surfaces 66, 68 and 70 on slide 34 and pivotal cam 32 can, at times, be brought into a mating engagement. When this occurs, bail 20 is then rotationally linked to pivotal cam 32 as the rotation of bail 20 will be transmitted through the vertical rear surface 66' of slide 34 to the vertical rear surface 66 of notch 64 to push against and now rotate pivotal cam 32.

A torsion spring 72 is used to bias bail 20 into its blade disengaged position. Torsion spring 72 is received inside housing 36 in an annular recess 74 with one end 76 of spring 72 being received against a lip 78 in housing 36. The other end 80 of spring 72 extends through an arcuate slot 82 in pivotal cam 32 to be received in a small hole 84 in the adjacent handle tube 8 of handle assembly 4. When bail 20 rotates clockwise about its pivot point towards its blade engaged position as indicated by the arrow A in FIG. 1, the lip 78 pushes against the inner end 76 of torsion spring 72 to tension spring 72. When bail 20 is released by the operator, the tension in torsion spring 72 helps move bail 20 back to its blade disengaged position.

Torsion spring 72 is effective to only move or act on bail 20. A separate biasing means acts on pivotal cam 32, namely the spring force (not shown) that is normally associated with control cable 30. When pivotal cam 32 is rotated by bail 20 to pull on control cable 30, this rotation acts against the spring force that is normally present on cable 30. When bail 20 is released, the cable spring force rotates pivotal cam 32 back to its initial position.

Figure 6:
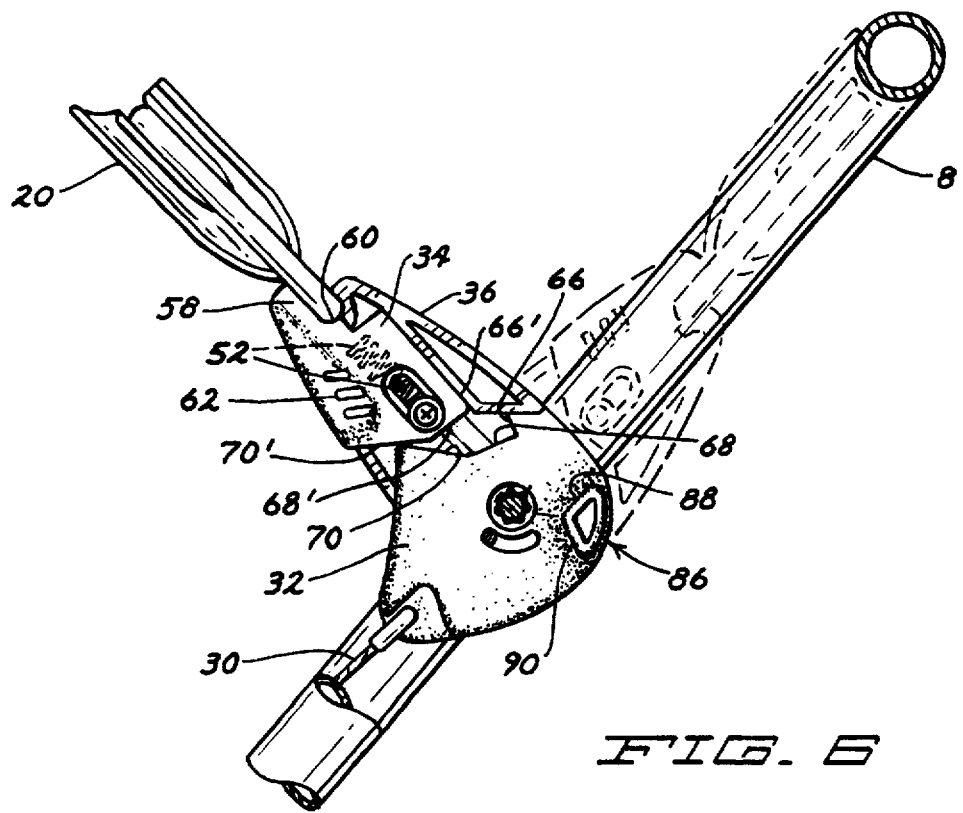
FIG. 6 is a side elevational view illustrating the opposite side of the control system of this invention, more particularly showing the control system in its blade disengaged position.
Figure 7:
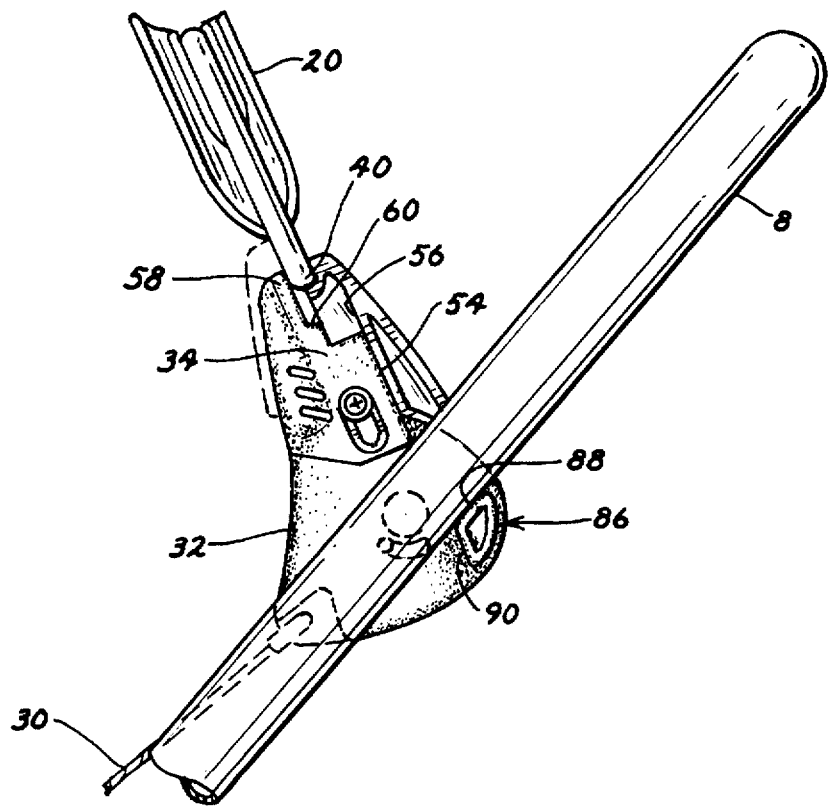
FIG. 7 is a side elevational view illustrating the opposite side of the control system of this invention, more particularly showing the control system having started its movement out of its blade disengaged position towards its blade engaged position with the slide member having been pushed down using the first operator action.
Figure 8:
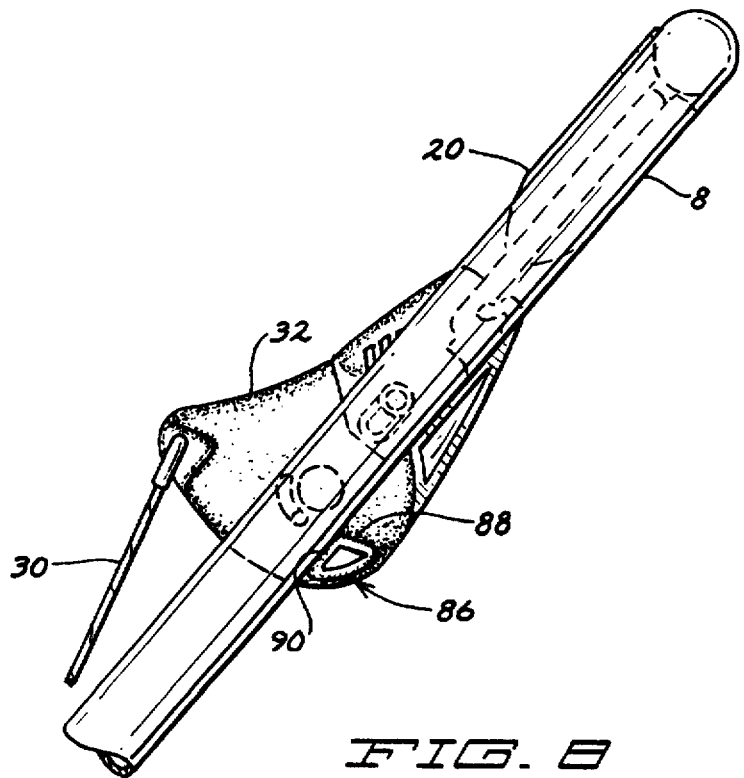
FIG. 8 is a side elevational view illustrating the opposite side of the control system of this invention, more particularly showing the control system having moved into its blade engaged position after the second operator action comprising pivoting of the control bail.

Pivotal cam 32 includes means for limiting the rotation thereof to a predetermined amount. This rotation limiting means includes a stop 86 having first and second surfaces 88 and 90, respectively. In the initial position of pivotal cam 32 as shown in FIG. 6 or 7, namely the position in which control cable 30 has not been pulled, stop surface 88 engages against the underside of the adjacent handle tube 8. In the second rotated position of pivotal cam 32 as shown in FIG. 8, namely the position in which control cable 30 has been pulled, the other surface 90 will be brought adjacent the underside of handle tube 8 at about the same time as the cross member 22 of bail 20 abuts or nests up against cross tube 10 of handle assembly 4. However, cross member 22 of bail 20 preferably engages cross tube 10 first to arrest the rotation of bail 20 slightly before surface 90 would have engaged handle tube 8 so that surface 90 is not technically itself a stop surface. The surfaces 88 and 90 are spaced apart relative to one another a distance slightly less than 90°. This is also the distance of arcuate slot 82 since pivotal cam 32 has to be able to move past the fixed end 80 of torsion spring 72 during its pivotal motion.

Bail 20 is arranged for a pivoting motion that is somewhat greater than the pivotal motion of pivotal cam 32. In other words, bail 20 has a total range of angular motion that exceeds that of pivotal cam 32 by some 10° to 20°. This permitted overtravel of bail 20 compared with the travel of pivotal cam 32 is effective in conjunction with the camming surfaces 70 in mechanically camming or returning slide 34 from its lower position to its upper position. This will be understood and appreciated more clearly after considering the following operational description of control system 2.

The initial disengaged position of control system 2 is shown in FIG. 6. In this position, slide 34 is biased by spring 52 into its upper, blade disengaged position. If the operator grabs and rotates bail 20 in a clockwise direction until bail 20 lies flat against handle assembly 4, but does not first push on slide 34, the slide 34 and housing 36 simply rotate around the upper edge of pivotal cam 32 without rotating cam 32. In other words, while bail 20 and its associated components are pivoted into their phantom line position in FIG. 6, pivotal cam 32 never leaves its solid line position and control cable 30 is not pulled on. Thus, blade 16 does not start rotating.

During this rotation of bail 20, torsion spring 72 is tensioned. Thus, when bail 20 is released, torsion spring 72 will return bail 20 from the phantom line position to the solid line position in FIG. 6. Again, bail 20 and its associated components simply pivot back around the stationary cam 32 which was never moved in the first place. Thus, if the operator never engages slide 34, bail 20 can be rotated back and forth between its solid and phantom line positions shown in FIG. 6 any number of times without ever moving cam 32 or obtaining rotation of blade 16.

To obtain blade rotation, the operator must push down on slide 34 during the initial phase of rotation of bail 20, i.e. in the first 20° or so of rotation. When the operator uses this second operator action, i.e. the downward push on slide 34, this will cause the surfaces 66', 68' and 70' formed on the bottom of slide 34 to be engaged with those complementary surfaces 66, 68 and 70 of notch 64 on the upper edge of pivotal cam 32. In other words, the bottom of slide 34 drops down into notch 64 when the operator pushes down on slide 34. Then, the first operator action comprising the rotation of bail 20 by the operator will be effective in rotating pivotal cam 32 along with bail 20 due to the abutting engagement between the rear surfaces 66 in the sets of complementary surfaces. Thus, as bail 20 is pivoted towards its blade engaged position, it now carries pivotal cam 32 around with it, thereby pulling on control cable 30. This pull on control cable 30 is effective to actuate the controlled component on outdoor power equipment unit 6, namely it starts the rotation of blade 16.

Once the bottom of slide 34 drops down into notch 64, spring 52 will be ineffective in causing it to move out of engagement. The complementary mating surfaces on notch 64 exert sufficient pressure on slide 64 to keep slide 64 in its lower, blade engaged position. Thus, the operator does not have to continually keep pushing down on slide 64, but need do so only until slide 34 is engaged in notch 64 and rotation of bail 20 has continued on towards its blade engaged position.

When the operator desires to stop the rotation of blade 16, all he or she must do is to release bail 20 from its blade engaged position in which bail 20 lies flat against handle assembly 4. Torsion spring 72 acting on bail 20 will now pivot bail 20 back to its blade disengaged position as depicted by the arrow B in FIG. 1, and the spring force acting on control cable 30 will pivot pivotal cam 32 back to its initial position.

However, pivotal cam 32 will reach its initial position, i.e. the position where the stop surface 88 has engaged the underside of handle tube 8, before bail 20 reaches its blade disengaged position. Remember that bail 20 has an additional 10° to 20° of motion as compared to that of pivotal cam 32. In this last portion of bail movement, i.e. in the overtravel of bail 20 past pivotal cam 32, relative motion will occur between bail 20 and pivotal cam 32, causing the camming surfaces 70 to slide on one another. This sliding of the camming surfaces 70 will mechanically move or cam slide 34 out of its lower engaged position and automatically reset it to its upper disengaged position. Thus, even if spring 52 were to fail, the mechanical camming action imposed on slide 34 by this control system arrangement will be effective to always disengage bail 20 from pivotal cam 32 as bail 20 returns to its blade disengaged position.

It should be apparent that a consequence of the camming action is a foolproof resetting of slide 34 into its upper blade disengaged position. This ensures that two separate are distinct actions are always required to obtain subsequent blade operations, i.e. the push down on slide 34 along with the separate pivoting of bail 20. It ensures that slide 34 will not be jammed or somehow kept in its blade engaged lower position, thus preserving the safety aspects of the two separate and distinct actions of control system 2. Accordingly, control system 2 of this invention will be more reliable in operation than many known systems and thus safer to use.

Another advantage of control system 2 is its intuitive method of operation and ease of use. The thumb receiving recess 62 invites the operator to push down on slide 34 so that the operator will intuitively understand that slide 34 needs to be pushed down. Slide 34, slide housing 36 and pivotal cam 32 are all simply mounted on one of the bail legs 24 beneath cross member 22 without obstructing cross member 22 or unduly cluttering bail 20. Moreover, pushing down on slide 34 serves to directly engage the bottom of slide 34 in notch 64 to couple bail 20 to pivotal cam 32. Thus, no complicated and extended linkage is required to accomplish this coupling function such that long link arms, biasing springs and the like can be dispensed with. Accordingly, control system 2 according to this invention is durable and reliable in operation.

When bail 20 is in its normal component disengaged position as shown in FIG. 6, it would be possible to rotate bail 20 forwardly out of this position. This forward rotation would be transmitted by the bottom of slide 34 to pivotal cam 32 since the front edge of camming surface 70 still engages with the bottom of slide 34 even in the upper, component disengaged position of slide 34. Stop surface 88 on stop 86 engages the bottom of handle tube 8 to prevent this forward rotation of cam 32 and to keep the parts in their usual orientation of FIG. 6. If enough force is applied to bail 20 to force stop 86 past handle tube 8 during this unintended forward rotation of bail 20 out of its component disengaged position, the control system 2 will disassemble itself, i.e. the outwardly turned legs 26 on bail 20 will disengage from handle tubes 8, before cam 32 can be rotated far enough to actuate cable 30.

While pivotal cam 32 has been shown as pulling on a Bowden type control cable 30 to actuate the controlled component, other arrangements are possible. For example, pivotal cam 32 might act directly on the contacts of an electrical switch mounted on handle tube 8 with the switch being open in the initial FIG. 6 position of pivotal cam 32 and the switch being closed in the rotated FIG. 8 position of pivotal cam 32. In such a case, control cable 30 would be dispensed with although some means for biasing pivotal cam 32 back to its initial position would then be needed, e.g. an additional spring.

Various other modifications will be apparent to those skilled in the art. For example, a second control cable similar to cable 30 could be added to control system extending between some portion of bail 20 and a traction drive (not shown) on lawn mower. This would provide single action actuation of the traction drive simply by pivoting bail 20, with two actions still being required to obtain rotation of blade 16. Accordingly, the scope of this invention is to be limited only the appended claims.

We claim:

1. A control system for an outdoor power equipment unit having a selectively actuable component, which comprises:
   (a) a first movable control member mounted on the unit for movement between a component disengaged position and a component engaged position using a first operator action;
   (b) a second movable control member mounted on the unit for movement between a component disengaged position and a component engaged position using a second operator action that is separate and distinct from the first operator action, wherein both the first and second control members must be moved, respectively, into the component engaged positions using the first and second operator actions to obtain actuation of the component; and
   (c) means for mechanically camming the second movable control member back into the second control member's component disengaged position during movement of the first movable control member from the first control member's component engaged position to its component disengaged position.

2. The control system of claim 1, wherein the first movable control member is pivotally mounted on the unit.

3. The control system of claim 1, wherein the second movable control member is slidably mounted on the unit.

4. The control system of claim 1, wherein the first movable control member is pivotally mounted on the unit and the second movable control member is slidably mounted on the unit.

5. The control system of claim 4, wherein the second movable control member is slidably mounted on the first movable control member.

6. The control system of claim 1, wherein the first movable control member comprises a U-shaped pivotal bail, and the second movable control member comprises a slide that is slidably mounted on the bail.

7. The control system of claim 6, wherein the control system further includes a second pivotal member having a notch, wherein one end of the slide is engaged in the notch of the second pivotal member when the slide is disposed in the slides's component engaged position with the one end of the slide being disengaged from the notch when the slide is disposed in the slides's component disengaged position.

8. The control system of claim 7, wherein the one end of the slide and the notch of the second pivotal member having cam surfaces that are brought into abutting engagement with one another when the one end of the slide is engaged in the notch, the means for pivotally mounting the bail and the second pivotal member permitting overtravel of the bail past the second pivotal member when the bail moves between the bail's component engaged and the bail's component disengaged positions to cause the cam surfaces to slide on one another to mechanically cam the one end of the slide out of the notch.

9. The control system of claim 6, further including a spring for biasing the one end of the slide away from the notch in the second pivotal member.

10. The control system of claim 6, further including means operatively coupled to the second pivotal member for actuating the component of the outdoor power equipment unit when the one end of the slide is engaged in the notch and the pivotal bail is rotated into the bail's component engaged position.

11. The control system of claim 10, wherein the coupling means comprises a control cable extending between the second pivotal member and the component of the outdoor power equipment unit.

12. A control system for an outdoor power equipment unit having a selectively actuable component, which comprises:
 (a) a pivotal deadman's control carried on the outdoor equipment unit capable of being gripped and moved in a pivoting motion by an operator in a component actuating direction;
 (b) a second pivotal member that is operatively coupled to the component for actuating the component; and
 (c) means for selectively linking the second pivotal member to the deadman's control using an other action of the operator that is separate and distinct from the pivoting motion of the deadman's control such that the pivoting motion of the deadman's control is effective after the other action has occurred to rotate the second pivotal member to actuate the component, wherein the linking means comprises:
  (i) a slide slidably carried on the deadman's control for straight line movement towards and away from the second pivotal member; and
  (ii) a notch formed in the second pivotal member for receiving one end of the slide after the slide is pushed towards the second pivotal member using the straight line motion.

13. The control system of claim 12, further including means for biasing the deadman's control in an opposite direction opposite to the component actuating direction to automatically deactivate the component whenever the operator releases the deadman's control, and wherein the linking means includes means for camming the one end of the slide out of the notch after the deadman's control is released by the operator and the deadman's control is moving in the opposite direction under the influence of the biasing means.

14. The control system of claim 13, wherein the camming means includes:
 (a) means for permitting relative motion between the deadman's control and the second pivotal member during some portion of the movement of the deadman's control in the opposite direction; and
 (b) inclined cam surfaces carried on the one end of the slide and the notch which are effective during the relative motion between the deadman's control and the second pivotal member to cam the one end of the slide out of the notch.

15. A control system for an outdoor power equipment unit having a selectively actuable component, which comprises:
 (a) a U-shaped pivotal bail carried on the outdoor equipment unit capable of being gripped and pivoted by an operator in a component actuating direction between a component disengaged position and a component engaged position, the bail having a transversely extending cross member and spaced downwardly extending legs each of which are pivotally mounted to the outdoor power equipment unit for rotation of the bail about a pivot axis;
 (b) a housing fixed to one of the legs of the bail beneath the cross member; and
 (c) a slide slidably carried on the housing for movement towards and away from the pivot axis of the bail between a component disengaged position and a component engaged position using a pushing action that is separate and distinct from the pivotal motion of the bail, wherein both the bail and the slide must be moved, respectively, into the component engaged positions to obtain actuation of the component.

16. The control system of claim 15, wherein one face of the slide includes a recess sized to receive an operator's thumb to facilitate the operator pushing downwardly on the slide to move the slide from the slide's component disengaged to the slide's component engaged position.

17. The control system of claim 15, wherein the housing includes a pin received in a slot on the slide for slidably mounting the slide to the housing.

18. The control system of claim 17, further including a spring extending between the top of the pin and some portion of the slide for biasing the slide upwardly relative to the housing into the slide's component disengaged position.

19. The control system of claim 15, further including means for camming the slide from the slide's component engaged position back to the slide's component disengaged position during motion of the bail from the component engaged position back to the slide's component disengaged position.

20. The control system of claim 19, wherein the camming means includes a pivotal cam pivotally carried on the bail beneath the slide.

21. The control system of claim 20, wherein the cam includes a notch into which one end of the slide drops when the slide is in the slide's component engaged position, the notch and the one end of the slide having inclined camming surfaces that are effective during motion of the bail from the bail's component engaged position to the bail's component disengaged position to move the slide upwardly.

* * * * *